United States Patent [19]

Bezoari

[11] Patent Number: 4,594,394
[45] Date of Patent: Jun. 10, 1986

[54] PROCESS FOR METALATING POLYOLEFIN HALIDES

[75] Inventor: Massimo D. Bezoari, Baton Rouge, La.

[73] Assignee: The Dow Chemical Company, Midland, Mich.

[21] Appl. No.: 711,931

[22] Filed: Mar. 15, 1985

[51] Int. Cl.[4] .................................................. C08F 8/42
[52] U.S. Cl. .................................. 525/331.5; 525/366
[58] Field of Search .............................. 525/331.5, 366

[56] References Cited

U.S. PATENT DOCUMENTS 3,808,173  4/1974  Orihashi ........................... 525/331.5
4,243,770  1/1981  Tatemoto et al. .................. 525/366

OTHER PUBLICATIONS

"Reaction of n—Butyllithium with Poly(vinyl Chloride)", K. Shina et al., Journal of Polymer Science: Part A-1, vol. 4, 1069–1079 (1966).

"Nickelation of poly(vinyl chloride) by organonickel complexes", Takakazu Yamamoto, Chemistry and Industry, Jan. 3, 1981, pp. 28 and 29.

Primary Examiner—Joseph L. Schofer
Assistant Examiner—Bernard Lipman
Attorney, Agent, or Firm—Dan R. Howard

[57] ABSTRACT

A process is disclosed for metalating a polyolefin halide so that there is a low amount of cross-linking site reactions. The process comprises adding a solvated trans-metalating organometallic compound to a cement mix of a polyolefin halide and a solvent. The reaction temperature is below $-20°$ C.

14 Claims, No Drawings

PROCESS FOR METALATING POLYOLEFIN HALIDES

BACKGROUND OF THE INVENTION

Metalation, especially lithiation, of polyolefin halides, such as polyvinyl chloride and polyvinyl bromide, is known to yield useful intermediates. These intermediates can be used to produce functionalized polyolefin halides and graft and cross-linked copolymers containing a polyolefin halide.

A process for producing these intermediates is reported in "Reaction of n-Butyl-lithium with Poly(vinyl Chloride)", K. Shina et al, Journal of Polymer Science: Part A-1, Vol. 4, 1069–1079 (1966). The process comprises adding n-butyl lithium in n-heptane to a stirred anhydrous tetrahydrofuran/poly-vinyl chloride solution, which solution is initially at room temperature. The reaction mix is reported to take on a deep purple color indicating that lithiation, to some degree, of the polyvinyl chloride has occurred. Hydrolysis, carbonation, etc, or the addition of styrene or other polymers for grafting to the reaction mix were effected after the lithiation reaction. It is reported that all resultant polymers, except grafted styrene, were yellow or pale yellow, brittle substances which were insoluble in benzene, alcohol, cyclohexane, carbon tetrachloride, and the like. These properties foretell of little commercial acceptability for these polymers and are an indication that the metalation reaction is producing a moderately highly cross-linked intermediate.

Therefore, it is an object of this invention to provide a process for metalation of polyolefin halides to produce an intermediate which yields a graft copolymer or a functionalized polyolefin halide product which has a white or very pale color, pliability and exhibits good solubility in most solvents.

The Invention

This invention relates to a process for metalating a polyolefin halide which comprises adding a solvated transmetalating organometallic compound to a cement mix of a polyolefin halide and a solvent, wherein the process occurs at a temperature within the range of from about −20° C. to about −80° C. Halogen utilization by metalation, dehydrohalogenation, cross-linking, alkylation, etc., is only from about 5 to about 40 percent of the halogen originally present in the halogenated polyolefin. Thus, the metalated halogenated polyolefin maintains most of its original physical properties for contribution to the final graft copolymer or functionalized polymer product. Furthermore, the pale color, solubility and pliability of the functionalized polyolefin halides and the graft copolymers formed from the intermediates of this invention are indicative of a low amount of cross-linking in the intermediate. It is theorized, though the process of this invention is not to be limited by this theory, that the process conditions cause an increase in alkylation side reactions thereby taking up many of the halide sites which would normally be cross-linking and/or dehydrohalogenation sites under the prior art process conditions.

By polyolefin halide, it is meant those polymers which are composed primarily of olefin chloride or olefin bromide units. Polyvinyl chloride is a preferred polymer due to its commercially desirable properties, its availability and cost.

The olefin constituent of the olefin halide can generally be defined as one containing from about 2 to about 8 carbon atoms. The polyolefin halide can be a long chain polymer so long as it is soluble in the ether-containing solvent. For example, if the polyolefin halide is polyvinyl chloride, it can have a molecular weight up to about 500,000 and still be acceptably soluble in the solvent. Suitable polyolefin halides for the process of this invention are exemplified by polyvinyl chloride, polypropylene bromide, polybutylene bromide, polypiperylene chloride, poly(4-methylpentene) chloride, polyvinyl bromide and polyoctadiene bromide. Solubility suitability for any particular polyolefin halide is best determined by observation of its solubility in the particular solvent at the selected reaction conditions.

The solvent utilized to dissolve the polyolefin halide should be one which is non-reactive towards the transmetalating organometallic compound used in the reaction, is a liquid at reaction temperatures and is anhydrous. Preferred solvents are those which are ether-containing. The ether constituent is preferably tetrahydrofuran, diethylether, 1,2-dimethoxy ethane or methoxy benzene. Generally, the weight percent of polyolefin halide in the ether containing solvent will be below about 10 weight percent and preferably within the range of from about 2 to about 5 weight percent, all based on the total weight of the solution.

The transmetalating organometallic compounds used in the process of this invention are those which are capable of transferring a metal ion to the polymer under the process conditions. Due to their recognized transmetalating abilities, alkali metal alkyl compounds are preferred. The preferred alkali metal constituent is lithium. The alkyl constituent can contain up to about 8 carbon atoms and may have a tertiary, secondary or primary bond to the metal. For example, the alkyl constituent can be ethyl, n-butyl, sec-butyl, tert-butyl, methyl, phenyl, allyl, n-octyl, 2-methyl-2-butyl, propyl and the like. The preferred alkyl constituent is n-butyl. The compound, n-butyl lithium, has received wide acceptance in the transmetalation art as a superior reactant and is a preferred reactant for the process of this invention.

The high reactivity and high affinity for vigorous reaction with moisture makes it necessary to provide the transmetalating organometallic compounds to the process of this invention as anhydrous solutions. The solvents used are any of those which are commonly used by the chemical industry for handling such organometallic compounds and which remain a liquid and are non-reactive under process conditions. For example, hexane, pentane, benzene, toluene and various ethers are suitable. The molar concentration of the transmetalating organometallic compound in solution is preferably in the range of from about 1.0 to about 3.0.

The transmetalating reaction of the process of this invention should occur at a temperature below −20° C. and preferably within the range of from about −20° C. to about −80° C. Ambient pressure is suitable. To maintain anhydrous conditions and to prevent unwanted "sport" reactions, the reaction should be carried out under a moisture-free inert atmosphere such as that provided by dry nitrogen or argon.

The relative amounts of the polyolefin halide and the transmetalating organometallic compound used for the reaction are determinative of the extent of lithiation of the polyolefin halide. In preferred processes of this invention, the molar ratio of organometallic to halogen is within the range of from about 0.1 to about 0.3.

In order that any portion of the polyolefin halide solution does not see more of the transmetalating organometallic compound than other portions, it is desirable that the latter be added to the former while the entire reaction mix is continuously blended. Blending of the reaction mix will insure the homogeneity thereof and can be carried out by mechanical stirring, however, other conventional blending techniques may be used. The rate of addition of the transmetalating organometallic compound is any convenient rate which is in keeping with the capability of the blending method to insure substantial homogeneity of the reaction mix.

The metalated polyolefin halides produced by the process of this invention are, as before mentioned, useful in the production of graft copolymers and functionalized polymers. Such copolymers are produced after the metalating reaction is substantially complete—such completion occurring within ten minutes of the organometallic addition and being indicated by the reaction mix obtaining a clear dark red/purple color. The grafting or functionalization procedure used can be any of those known to those skilled in the art. See, for example, the before-cited literature by K. Shina et al. For example, graft copolymers of polyolefin halides and electrophilic polymers can be produced by: adding an electrophilic polymer in a solvent, such as tetrahydrofuran, to the metalated polyolefin halide; precipitating the resultant product by the further addition of alcohol; and purifying the precipitate with an acetone wash. The reaction temperature is within the range of from about $-80°$ C. to about $+50°$ C. Especially useful graft copolymers are those in which one copolymer moiety is polyvinyl chloride and the other is polymethylmethacrylate or styrene-acrylonitrile. Functionalization can be carried out by the reaction of the metalated polyolefin halide with carbon dioxide, oxalyl chloride, phosphorus oxychloride, sulfuryl chloride, dimethylfulvene, toluene diisocyanate and the like.

The invention is illustrated by the following examples. These examples are given merely for purposes of illustration and are not intended in any way to restrict the scope of the invention nor the manner in which it can be practiced. The polyolefin halide used in the following examples was polyvinyl chloride having a molecular weight of about 80,000.

EXAMPLE I 1.0 Gram of polyvinyl chloride was dissolved in 50 mL anhydrous tetrahydrofuran at room temperature, under nitrogen, in a 100 mL RB flask fitted with thermometer, condenser, and nitrogen inlet. The clear solution was cooled to $-65°$ C. by means of a dry ice/acetone bath. No increase in viscosity was observed. To the cooled solution, 2 mL of a 1.55M solution of n-butyl lithium in hexane was added dropwise from a syringe. The formation of lithiated polyvinyl chloride was evidenced by the appearance of pink/purple colored complex. No gel formation was noticed.

Example II

A stochiometric excess of oxalyl chloride was added dropwise to lithiated polyvinyl chloride produced in accordance with the procedure of Example I. An immediate loss of color was noted. The resultant product was precipitated with methanol, dissolved in methylene chloride and reprecipitated with methanol three times. A white polymer was filtered from the reaction mix and washed with more methanol. The white product was sufficiently pliable to press into a film having a thickness of approximately two mils. This pressing was accomplished by preheating the polymer to 372° F. for 1½ minutes followed by pressing the heated polymer under 15 tons pressure at a temperature of 372° F. for about 2½ to about 3 minutes. The pressed polymer was then cooled for 5 minutes to room temperature under a pressure of 5 to 15 tons. The thin film was placed on a paper holder with windows for infrared scanning with a Perkin-Elmer 283 IR spectrometer. Absorption bands were found at 1840-1680 cm$^{-1}$ indicating the presence of carbonyl functional groups on the polyvinyl chloride.

EXAMPLE III

A stochiometric excess of toluene diisocyanate was added to $-65°$ C. lithiated polyvinyl chloride produced as in Example I. An immediate color change was noted with the resultant reaction mix taking on a pale yellow color within seconds. The resultant product was precipitated with methanol and washed with acetone and methanol. After redissolving the precipitated methylene chloride, it was reprecipitated with methanol twice. The precipitate was recovered as a tan powder. This powder was sufficiently pliable so that it was formed into a thin film, i.e., 2 mils thick, for infrared analysis. The infrared analysis and the formation of the film was accomplished by the same procedure disclosed in Example II for the formation of such a film and infrared analysis. The infrared analysis showed absorption bands centered at 1725 cm$^{-1}$ indicating the presence of carbonyl functional groups on the polyvinyl chloride.

EXAMPLE IV

A stochiometric excess of phosphorus oxychloride was added to $-65°$ C. lithiated polyvinyl formed by the procedure of Example I. Immediate color change was noted with the final color being a pale yellow. The resultant product was precipitated with methanol and washed with methanol-water and redissolved in methylene chloride. The precipitation with methanol was effected twice. A pale yellow polymer was recovered as a precipitate by filtration. This polymer, like the polymers formed in Examples II and III, was sufficiently pliable for formation into a thin 2 mil thick film.

EXAMPLE V

A stochiometric excess of sulfuryl chloride was added to $-65°$ C. lithiated polyvinyl chloride which was produced in accordance with the procedure of Example I. The purple color of the lithiated polyvinyl chloride became clear within seconds. 20 mLs of distilled water was added and a white polymer was then precipitated with methanol. This polymer was redissolved in methylene chloride and reprecipitated twice more. The filtered polymer was washed with water in methanol. The polymer was dried in an oven overnight before analysis. Elemental analysis showed 0.2% sulfur.

EXAMPLE VI

Styrene monomer was added to $-65°$ C. lithiated PVC (produced as in Example I) and caused a further color change toward red, indicating the presence of styoyl anion. After the addition, the reaction mixture was allowed to warm to ambient temperature before quenching with methanol. The polymer product was purified as in the previous examples.

EXAMPLE VII

To determine the percentage of chlorine sites which are lithiated and, by difference, the percentage of chlorine sites involved in side reactions, the following procedure was followed.

2 g of polyvinyl chloride were dissolved as extensively as possible in 1 hour in stirred 80-90 mL anhydrous tetrahydrofuran under nitrogen. This solution was immersed in a dry ice/acetone bath until the contents of the flask were at $-25°$ C. Butyl lithium (2.52 mL of 2.6M solution in hexane, $6.6 \times 10^{-3}$ mole) was added to ca. 5 mL hexane, and added dropwise to the polyvinyl chloride/tetrahydrofuran mixture. The clear mixture immediately darkened to a red/purple color. After addition was complete (ca. 2 minutes), the reaction was allowed to continue for 4-5 minutes. Addition of a mixture of ethanol, tetrahydrofuran, and water (ca. 1:1:1) caused the reaction mixture to turn to pale yellow, signifying the "quenching" of reactive metalated sites on the polyvinyl chloride polymer. A few drops of phenolphthalein indicator in alcohol solution were added to the reaction vessel, and the mixture became purple, indicating the basicity of the mixture. A standard solution of HCl in $H_2O$ (0.379M) was added dropwise by means of a buret, until the purple indicator turned clear. The amount of HCl required for neutralization was 2.95 mL ($1.1 \times 10^{-3}$ mole). The amount of butyl lithium remaining in the syringe and bottle was found by washing them in $H_2O$ and titrating the resulting basic $H_2O$ as above. Thus, the amount of butyl lithium remaining in the syringe and bottle was found to be neutralized by 1.0 mL HCl (0.379M). The amount of butyl lithium actually used in the reaction was therefore (6.6-0.38) millimoles, i.e., 6.2 millimoles. The amount of active lithiated species is found to be $(1.1/6.2) \times 100$ percent of the added butyl lithium, i.e., 20%. The extent of side reactions was therefore 80%.

EXAMPLE VIII

Polyvinyl chloride was lithiated as in Example I and samples were taken from the reaction mix at 1 minute intervals. These samples were immediately quenched by addition to $H_2O$, and, after drying, the weight percent of Cl was obtained by thermal gravimetric analysis. The data showed that the overall weight percent of Cl reacting was about 5% of the initial weight of polyvinyl chloride added. Initially, the polyvinyl chloride contained 57.7 weight percent Cl and the quenched samples were about 52 weight percent Cl.

I claim:

1. A process for metalating a polyolefin halide which process comprises:

(a) forming a reaction mixture by adding a first solution of an alkyllithium compound containing from 2 to about 8 carbon atoms and an inert solvent to a second solution of a polyolefin halide and an ether-containing solvent, said compound being added in an amount sufficient to provide a molar ratio of said compound to the halogen in said polyolefin halide within the range of from about 1:10 to about 3:10; and (b) maintaining the reaction mixture at a temperature below about $-20°$ C. until said metalation is substantially complete.

2. The process of claim 1 wherein said temperature is within the range of from about $-20°$ C. to about 31 80° C.

3. The process of claim 1 wherein said alkyllithium compound is n-butyl lithium.

4. The process of the claim 1 wherein said polyolefin halide is a polyolefin chloride.

5. The process of claim 4 wherin said polyolefin chloride is polyvinyl chloride.

6. The process of claim 3 wherein said inert solvent is hexane.

7. The process of claim 3 wherein said halogenated polyolefin is a polyolefin halide.

8. The process of claim 7 wherein said polyolefin halide is polyvinyl chloride.

9. A metalated polyolefin halide in which the olefin halide in each polymer unit contains from about 2 to about 8 carbon atoms and which is produced by:

(a) forming a reaction mixture by adding a first solution of an alkyllithium compound containing from 2 to about 8 carbon atoms and an inert solvent to a second solution of a polyolefin halide and an ether-containing solvent, said compound being added in an amount sufficient to provide a molar ratio of said compound to the halogen in said polyolefin halide within the range of from about 1:10 to about 3:10; and (b) maintaining the reaction mixture at a temperature below about $-20°$ C. until said metalation is substantially complete.

10. The metalated polyolefin halide of claim 9 wherein the halide constituent of each olefin halide unit is chlorine.

11. The metalated polyolefin halide of claim 10 wherein the olefin constituent is vinyl.

12. The metalated polyolefin halide of claim 9 wherein said alkyllithium compound in n-butyllithium.

13. The metalated polyolefin halide of claim 12 wherein the polyolefin halide is polyvinyl chloride.

14. The metalated polyolefin halide of claim 9 wherein the temperature is within the range of about $-20°$ C. to about $-80°$ C.

* * * * *